No. 701,592. Patented June 3, 1902.
T. J. LYNCH.
LOADING ATTACHMENT FOR HAND TRUCKS.
(Application filed Nov. 29, 1901.)
(No Model.) 2 Sheets—Sheet 1.
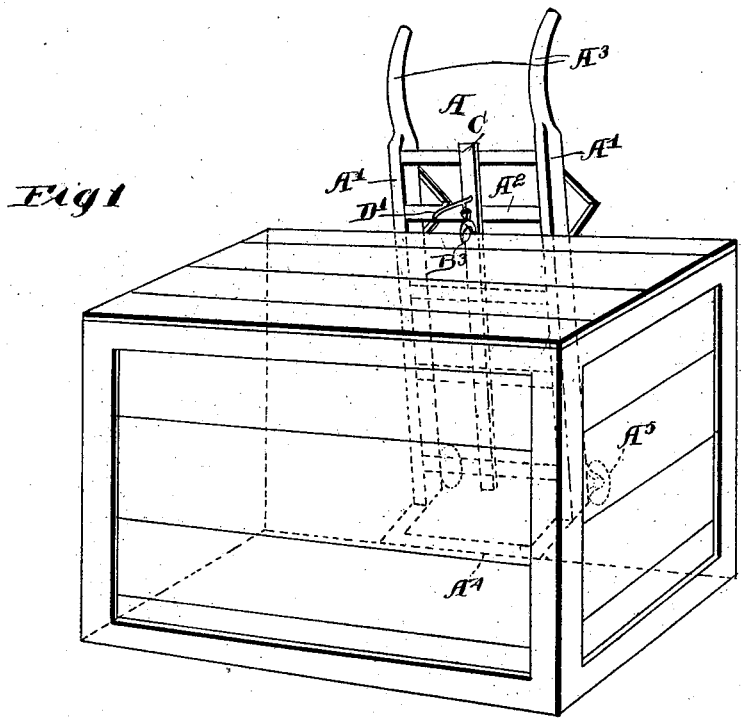
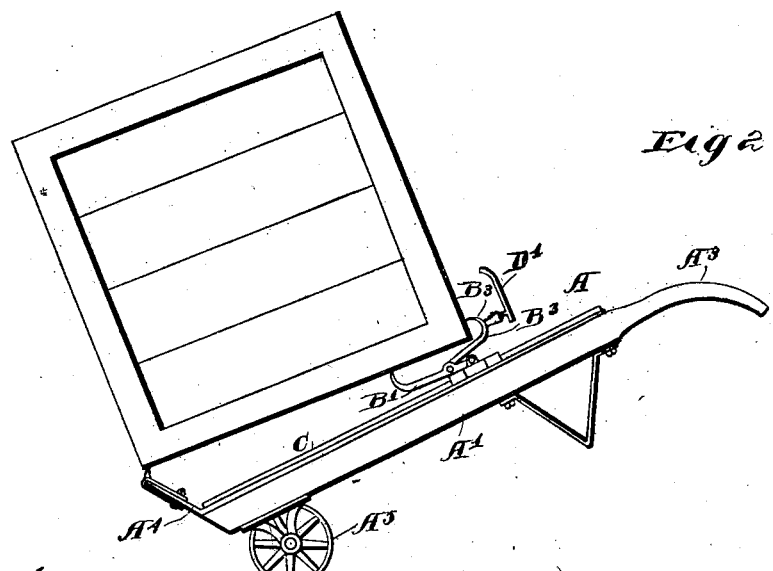
Witnesses:
Carl M. Crawford
William L. Hall
Inventor:
Thomas J. Lynch
by Poole & Brown
his Attorneys

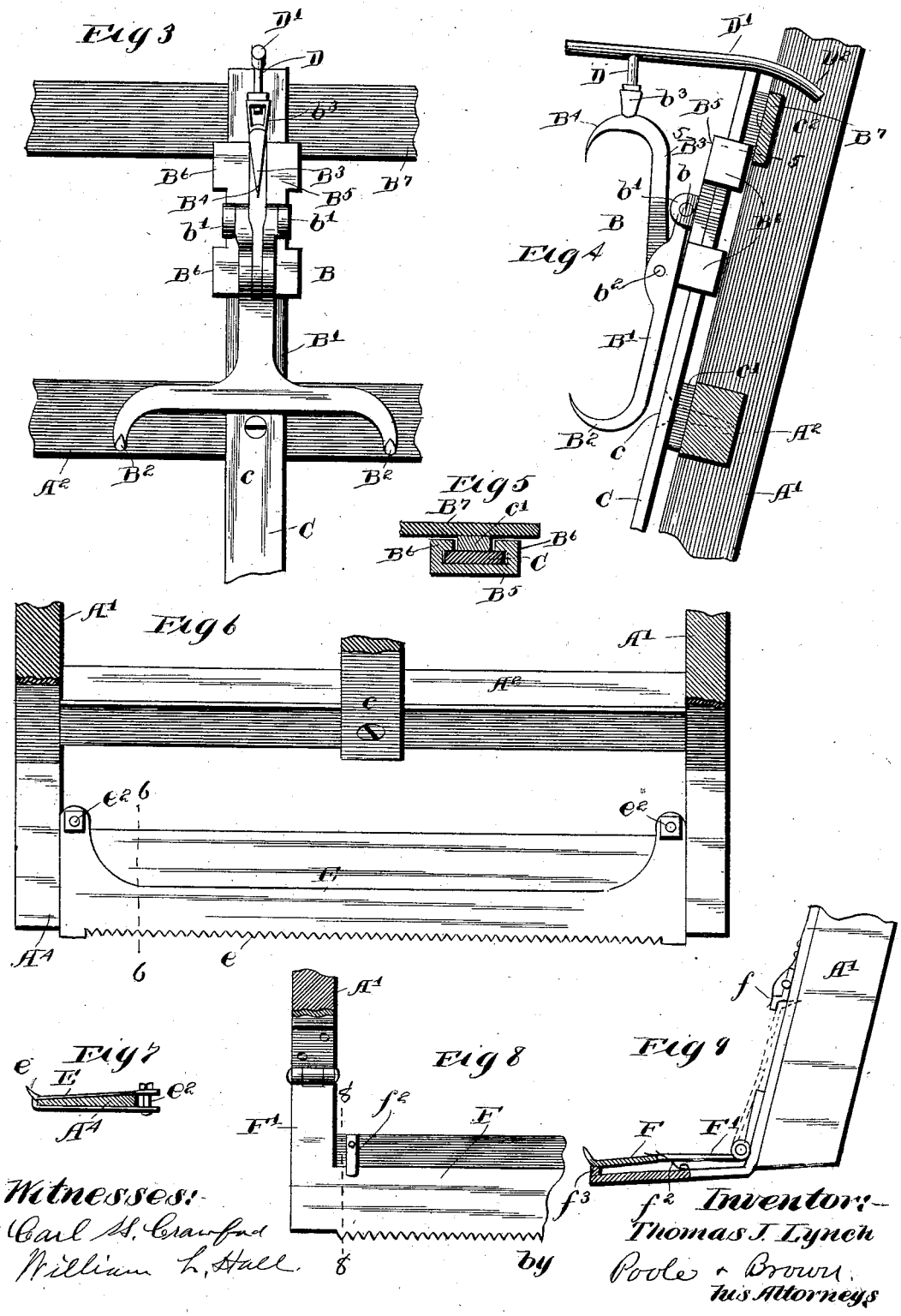

UNITED STATES PATENT OFFICE.

THOMAS J. LYNCH, OF OTTAWA, ILLINOIS.

LOADING ATTACHMENT FOR HAND-TRUCKS.

SPECIFICATION forming part of Letters Patent No. 701,592, dated June 3, 1902.

Application filed November 29, 1901. Serial No. 84,002. (No model.)

*To all whom it may concern:*

Be it known that I, THOMAS J. LYNCH, of Ottawa, in the county of Lasalle and State of Illinois, have invented certain new and useful Improvements in Loading Attachments for Hand-Trucks; and I do hereby declare that the following is a full, clear, and exact description thereof, reference being had to the accompanying drawings, and to the letters of reference marked thereon, which form a part of this specification.

This invention relates to an attachment for hand-trucks, and is designed to assist a person in loading boxes, cases, barrels, or the like on such trucks with the exertion of less power than heretofore required by the employment of devices in common use.

The invention consists in the matters hereinafter set forth and more particularly pointed out in the appended claims.

In the drawings, Figure 1 is a perspective view of a box or case, showing in dotted and full lines a truck provided with my improved attachment in position to engage the attachment with the box. Fig. 2 is a side view of the truck and box after the box has been loaded on said truck. Fig. 3 is a front view of the clutch device forming part of the loading device, showing fragments of the truck to which it is attached. Fig. 4 is a side view of the clutch device. Fig. 5 is a transverse section on line 5 5 of Fig. 4. Fig. 6 is a front view of the nose of the truck provided with my improvements. Fig. 7 is a transverse section on line 6 6 of Fig. 6. Fig. 8 is a fragmentary view of one end of the truck, showing a modification of the parts shown in Fig. 6. Fig. 9 is a cross-section on line 8 8 of Fig. 8.

As shown in said drawings, A designates a hand-truck of the usual form commonly employed in mercantile houses, railway-depots, baggage-rooms, and like places for moving heavy boxes, barrels, trunks, and the like from place to place. Said truck embraces side rails A' A', cross-bars A², handles A³, a nose A⁴ at the lower end thereof, and supporting-wheels A⁵.

Heretofore it has been a common practice in loading cases or boxes on hand-trucks for the person using the truck to force the nose of the truck beneath the box or case which is to be loaded thereon on the side thereof adjacent to the truck, and to pull the case over upon the truck by the use of a loading-hook held in one hand, while at the same time pulling or tilting the truck rearwardly about the axle as a fulcrum. This practice while fairly effective when loading boxes of comparatively light weight is exceedingly laborious in loading heavy boxes or cases, and it is often impossible for a man of ordinary strength or muscular power to handle boxes or cases of merchandise of the weight often found in mercantile houses or depots on trucks of this kind without the aid of an assistant.

It is the object of this invention to provide a device which will enable a man of ordinary strength to load without assistance boxes or cases of any practical weight or size on handtrucks, thereby saving not only the services of an assistant to aid in this work, but also greatly conserving the strength of the person using the truck.

My attachment may be applied to any handtruck of the type referred to and is so constructed as to be readily attached to the truck, thereby enabling the attachment to be applied to trucks already in use, as well as to be originally built in and form part of a new truck.

Referring to the improvements constituting my invention, B designates as a whole a clutch device which is mounted on the truck in a manner to slide from the upper to the lower end thereof to adjust the same to boxes, &c., of varying heights. Said clutch embraces a clutch member B', provided with two laterally-separated hook-shaped prongs B² B², an upper clutch member B³, provided with a single hooked-shaped prong B⁴, located centrally on the prongs B², and a base-plate B⁵, by which the device is movably connected with the truck. Said lower clutch member B' is pivoted at its upper end upon a pivot-pin $b$, passing transversely through the upper end of said clutch member and overlapping lugs $b'$, projecting from the base-plate. The upper clutch member B³ is loosely connected at its lower end to the shank of the lower clutch member, between the pivot $b$ and the prong of said lower clutch member, the said lower clutch member being herein shown as provided with a slot in which the end of the upper clutch member is mounted and connected by a pin $b^2$, passing through the overlapping parts.

The clutch device described is movably connected with the truck in a manner to shift from the upper to the lower end of the truck by means of a guide-rail C, located intermediate the rails of the truck and attached by rivets or bolts $c$ to the cross-bars of said truck. Suitable interlocking connections are provided between the guide-rail and base-plate of the clutch, permitting free movement of the clutch longitudinally of the rail, but preventing lateral displacement between the same. Said guide-rail C, as herein shown, is raised from the truck by blocks $c'$, interposed between the rail and transverse bars of the truck, and the base-plate $B^5$ is provided on its side margins with flanges $B^6 B^6$, which are folded over the side margins of said rail and overlap the lower face thereof, as shown in Fig. 5. The manner described of affixing the rail to the truck constitutes, in effect, an overhanging or T rail, and the flanges of the base-plate form on the under face of the plate an undercut groove, which fits over and interlocks with said rail. Obviously a reversal of this construction—to wit, a T-shaped lug on the base-plate and an undercut groove in the rail—would effect the same result. Said clutch device is by this construction free to slide from the upper to the lower end of the truck, whereby the device may be adapted to load boxes of various heights, and the upper end of the rail is made plain, so that the base-plate may be slipped off the upper end of said rail and the clutch device removed from the truck. The guide-rail C extends above the uppermost transverse bar usually found on trucks of this type, and, if desired, the upper end of said rail may be attached to a supplemental transverse bar $B^7$, extending between and attached to the side bars of the truck. Desirably said clutch device is provided with a handle by which the same may be conveniently manipulated to adjust the same to a box or the like, and said handle is shown as constructed to serve as a retaining means for holding said clutch at the upper end of the truck. Said handle consists of a shank D, which has rotative or swiveling connection with a lug $b^3$, formed on the hook portion of the upper clutch member $B^3$, and said shank is provided on its outer end with a rigid transverse handle-bar $D'$. One end $D^2$ of said handle is made of sufficient length to pass over and engage the upper end of the guide-rail or the transverse bar $B^7$ at the top of the truck when the said handle is lifted above said transverse bar and turned transversely to said bar, as shown in Fig. 4, thereby holding said clutch in its uppermost position. When said clutch device is to be released and adjusted to a box or the like to be loaded on the truck, said handle-bar $D'$ is turned or rotated in a position parallel or substantially parallel with said transverse bar $B^7$, at which time said clutch is free to slide downwardly along the guide-rail.

The nose $A^4$ of the truck is provided with retaining means which act to prevent the box, barrel, or the like from slipping downwardly on the truck while being loaded. Said retaining means, as shown in Fig. 6, consists of a plate E, which is attached to the transverse plate of said nose and is provided with a serrated forward edge $e$, which projects beyond the edge of the nose for contact with the box or the like. Said retaining-plate is formed to embrace the forward edge of the nose-plate and is provided with rearwardly-extending parts or lugs which extend past the rear margin of the nose-plate, above and below the same, and are provided with apertures for the reception of holding-bolts $e^2$, by which said retaining-plate is held in place. The serrated edge $e$ of said retaining-plate is preferably directed at a sharp angle to the plane of the upper faces of said plate, as shown in Fig. 7, in order to secure a firm hold of the plate on the box.

A modification of the retaining-plate is shown in Figs. 8 and 9, consisting of a transverse retaining-plate F, which overlies the transverse plate of the nose and is provided at its ends with rearwardly-extending arms $F'$, which are hinged to the truck at the base of the nose in a manner to permit the device to swing upwardly away from said nose and against the side bars of the truck, as shown by dotted lines in Fig. 9. The swinging retaining-plate is held in its lowermost position by means of short latch-strips $f^2$, desirably made of spring metal, which are pivoted at their rear ends to the upper face of the nose-plate and are adapted to swing over the serrated plate in a manner to prevent the plate from rising. When it is desired to swing the retaining-plate backwardly, the latch-strips are swung rearwardly free from the plate and being made of spring metal lie close against the nose-plate F. The device is held in its uppermost position, as indicated in dotted lines in Fig. 9, by means of spring-pressed latches $f$, attached to the side bars of the truck and adapted to overlap the front margin of the device. Desirably the retaining-plate F will not rest directly upon the upper face of the nose-bar, but a filling-strip $f^3$ is interposed between said plate and bar, as shown in Fig. 9. This construction prevents the serrated edge of said plate passing under a box or the like when addressed thereto. In either of the forms of the retaining device described the advance or serrated edge thereof may be made to conform to the contour of the article to be loaded on the truck—as, for instance, such edges may be made concave to adapt the same for use on barrels. If desired, the nose-plate of the truck may be itself serrated in lieu of attaching separate retaining-plates thereto.

The operation of the loading attachment described is as follows: When the attachment is not in use, the clutch is retained at the upper end of the truck by the handle-bar in the manner shown in Fig. 4. When a box or the like is to be loaded on a truck, said truck is raised on its nose in an upright or slightly forwardly-inclined position at the side of the box, with the serrated retaining-plates engaging the side wall of the box adjacent to the bottom thereof. The clutch is now released and allowed to slide downwardly on the guide-rail C until the lower clutch member passes between said truck and the box side and the upper clutch member engages the upper wall of the box, near the side margin thereof. The truck is now tilted rearwardly about the nose thereof as a fulcrum until the supporting-wheels thereof are brought into contact with the floor and the continued rearward swinging of the truck is about the axle thereof as a fulcrum. When the truck is tilted rearwardly in the manner described, stress is placed on the clutch device B, which primarily causes the upper clutch member to sink into the upper wall of the box, and said upper clutch member being pivoted to the lower clutch member, between the pivot of the latter and the prongs thereof, said stress causes the prongs of the lower clutch member to be forced toward and into the side walls of the box, this operation causing the clutch as a whole to firmly grasp the corner of the box and to hold the same in place with respect to the upper part of the truck. The retaining plate or plates on the nose of the truck prevent the box from slipping downwardly thereon after the same has been raised from the floor, and it is not, therefore, necessary or desirable that the advance edge of the nose be placed under the box. In the first movement of the truck rearwardly the center of gravity of the box is outside of the nose of the truck, and the weight thereof causes the clutch members to be pulled outwardly away from the truck. As the truck is moved backwardly and the center of gravity moves inwardly past said nose the upper end or side of the box falls toward the truck against said clutch, and thereby relieves the tension on said clutch members. At this time by reason of the movability of the clutch with respect to the guide-rail said clutch and its supporting-plate shift downwardly by the action of gravity on said rail to adjust the clutch to the new position of the box, this operation being automatically accomplished without disturbing the effective operation of the clutch on said box and therefore without danger of the clutch being released from the box.

By the use of the device described it will be observed that the strength of the person using the truck is exerted to the greatest advantage, he being able to use all his strength to tilt the truck backwardly in loading the box thereon. In the use of the ordinary loading-hook commonly employed the person using the truck must bend forwardly in order to engage the hook with the remote side of the case or box and is obviously not in position to exert his full strength to tilt the truck rearwardly.

The device herein illustrated adds but little weight or cost to the truck and may be applied thereto without weakening the parts of the truck. The bolts or rivets by which the guide-rail C is attached to the truck may be passed through the usual holes or openings in the transverse bars which are ordinarily provided for attaching the face-plates to said bars, and in case the upper transverse bar B⁷ be employed said bar may be attached to the truck in any suitable or preferred manner. The ease with which the device may be applied to the truck in use is a great advantage, as it enables a truck to be equipped with my device at the expenditure of little time and labor and does not require the assistance of a skilled mechanic to place the same on the truck.

It is obvious that many changes may be made in the details of construction without departing from the spirit of my invention, and I do not wish to be limited to such details except as hereinafter made the subject of specific claims. For instance, when the improvements are applied to a truck when the latter is originally constructed the usual nose may be omitted, and the retaining means at the lower end of the truck may be otherwise attached thereto.

I claim as my invention—

1. The combination with a hand-truck, of a clutch device connected therewith and movable endwise thereon, said clutch device being constructed to shift longitudinally of the truck during the loading of a box or the like thereon.

2. The combination with a hand-truck provided at the lower end thereof with means for preventing a box slipping thereon, of a clutch device connected therewith and movable endwise thereon, said clutch device being constructed to shift longitudinally on the truck during the loading of a box or the like thereon.

3. The combination with a hand-truck, of a longitudinal guide-rail thereon, a clutch device having interlocking connection with and sliding endwise on said rail, said clutch device being constructed to shift on said rail during the loading of a box or the like on the truck.

4. The combination with a hand-truck, provided at the lower end thereof with a series of teeth or serrations, of a central longitudinal guide-rail thereon, a clutch device having interlocking connection with and sliding endwise on said rail, said clutch device being constructed to shift on said rail during the loading of a box or the like on the truck.

5. The combination with a hand-truck having a guide or way thereon, a member freely slidable thereon, and a clutch device comprising a lower member pivoted to the sliding member and an upper member pivoted to the lower member, said lower and upper members being constructed to first grasp a load, and then shift their grasp as the center of gravity of the load changes in being lifted by the truck.

6. The combination with a hand-truck provided at its lower end with means preventing the box slipping thereon, of a guide-rail attached to the front thereof, a clutch device embracing a plate having interlocking and endwise-movable connection with the rail, a lower clutch member pivoted at its upper end to said plate and provided with laterally-separated prongs and an upper clutch member provided with a central prong and pivoted to the lower clutch member between the pivot of the latter and its prongs, said clutch constructed to shift their hold on a load during the transfer of the center of gravity of the load from its resting-place to the truck, substantially as described.

7. The combination with a hand-truck, of a clutch device comprising upper and lower clutch members adapted to grasp a box above and below the upper corner thereof, and a handle on the upper clutch member having a part adapted to engage with the truck to afford means by which said device is suspended at the upper end of the truck.

8. The combination with a hand-truck, of a clutch device comprising upper and lower clutch members adapted to grasp a box above and below the upper corner thereof, and a handle on the upper clutch member comprising a lateral member which has swiveling or rotative connection with said upper clutch member whereby it may be turned to overhang a part of the truck and said clutch be thereby suspended on the truck.

In testimony that I claim the foregoing as my invention I affix my signature, in presence of two witnesses, this 25th day of November, A. D. 1901.

THOMAS J. LYNCH.

Witnesses:
TAYLOR E. BROWN,
GERTRUDE BRYCE.